Oct. 9, 1962    R. T. ERBAN    3,057,256
OPTICAL SCREEN
Original Filed March 10, 1952

Richard Erban
INVENTOR.
BY

3,057,256
OPTICAL SCREEN
Richard T. Erban, 144—11 Sanford Ave., Flushing, N.Y.
Original application Mar. 10, 1952, Ser. No. 275,760, now Patent No. 2,780,136, dated Feb. 5, 1957. Divided and this application June 8, 1956, Ser. No. 590,121
3 Claims. (Cl. 88—28.93)

The present invention relates to optical screens and more particularly to a screen which will reflect incident light substantially back in the same direction from which it arrives for an appreciable range of angles of incidence.

This application is a division of my copending application, Serial No. 275,760 filed on March 10, 1952, now Patent No. 2,780,136 issued on February 5, 1957. Application Serial No. 275,760, in turn, is a continuation-in-part of application No. 778,571 filed on October 8, 1947 and now Patent No. 2,588,373 issued on March 11, 1952.

More particularly, this invention relates to projection screens and the like. Where it is desired to have a screen that will show an image projected onto it from the side opposite to the side seen by the observer (so called rear projection screen) considerable difficulties arise as a result of outside light which reaches the observer's side of the screen and is reflected from there into the eyes of the observer.

This outside or stray light raises the general level of illumination of the screen, or its apparent brightness all over the screen, so that dark and bright areas have their level lifted by the same amount; the net result is a decrease in contrast between light and dark areas, which, if it goes too far, will practically obliterate fine details from the image. To overcome this, screens of this type have heretofore been used mostly in rooms with strongly reduced light level, or covered by shadow boxes. Also various means have been proposed in order to reduce this reflected light by reducing the reflectivity of the screen surface by anti-reflection coatings, or by special filters positioned between the screen surface and the observer.

The present invention on the contrary provides a means in which the reflectivity of the screen surface is wholly immaterial as long as it is of the "specular" type, that is one in which little or no scattering of the reflected light occurs. Its screen surface is composed of a multitude of elements which are so constructed that all outside light that impinges upon the screen is reflected back in such directions which will avoid the eyes of the observer. This is accomplished by giving the elements the form of a hollow tri-cornered pyramid, such as illustrated in FIG. 1 of the accompanying drawing. The peculiarity of this pyramid consists in the fact that the three surfaces are inclined with respect to each other at exactly 90°.

It can be shown that any ray of light, which impinges upon such an element from anywhere within its apex will successively strike all 3 surfaces and then be sent back parallel to the direction in which it came. If the hollow pyramid is very small, the light ray will be returned exactly to the point from which it came. This excludes practically the pupils of the eyes of the observer since they do not radiate light.

A system of a multitude of these tri-cornered pyramids, nested into each other without any "dead" space between them can be obtained by the intersection of 3 systems of parallel, triangular grooves of a specific angle of inclination between their sides. The 3 systems of grooves must intersect each other at angles of exactly 120°, as illustrated in FIG. 3 of the accompanying drawing. A cross section through one system of such grooves is shown in FIG. 2.

Figure 1:
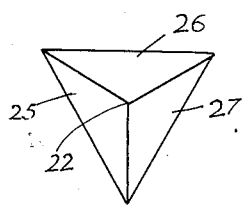
FIGURE 1 shows a hollow tri-cornered pyramid greatly enlarged.
Figure 2:
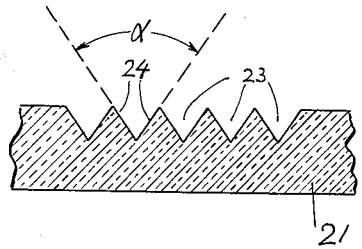
FIGURE 2 shows a cross section through one of the grooves.
Figure 3:
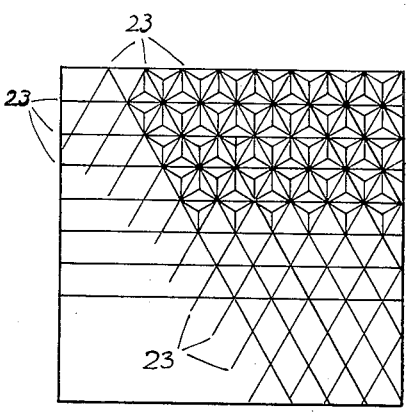
FIGURE 3 shows a plurality of tri-cornered pyramids formed from the intersection of three grooves.

All of these illustrations, as contained in FIGS. 1, 2, and 3, are exact duplicates of the disclosure contained in FIGS. 9, 8, and 6 of the drawings of my copending application above referred to, with the qualification that the FIGS. 1, 2, and 3 are slightly larger in size. The reference numbers used are likewise the same as those used in my copending application.

With respect to FIG. 2, it is important that according to this invention, the groove angle alpha is given by the equation:

cotan ½ alpha equal to square root of two

When grooves with this value of groove angle are brought to intersection at 120°, which may be done by cutting rows or such grooves into a flat plate, then the material left standing will form rows of tri-cornered pyramids, as shown, and the side angles of the surfaces will be 90° for each of the individual pyramids. These pyramids will be "positives" that is, not hollow pyramids; a metal plate so cut is then to be used as a die upon suitable plastic material, and it will leave an imprint of a multitude of little hollow pyramids, joining each other on their upper edges of the triangular opening, as may be seen from FIG. 3.

It is to be noted that the relative size of the grooves and pyramids in all figures have been exaggerated for the purpose of clarity of disclosure and that for practical application the grooves may be made very much smaller, as explained in my copending application.

While I have described a specific form of embodiment of my invention, it is understood that this is done by way of example and that modification may be brought to my invention without departing from its basic structure; and all such modification shall be understood to come within the scope of my invention which shall be limited only as defined by the following claims:

What I claim is:

1. In an optical projection device, a translucent rear projection screen adapted to be positioned with one of its surfaces facing an observer and the other of its surfaces being positioned to receive a projected image, the screen surface which faces the observer being composed entirely of contiguous equal triple pyramid-shaped recesses having 90° dihedral angles between adjacent faces of each individual recess, whereby light reaching said one surface from any extraneous source is retroflectively directed back in the direction of its arrival and stray-light effects by ambient light on said screen are at least partially avoided.

2. In an optical projection system for viewing projected images under conditions of ambient light, a translucent rear projection screen having a surface adapted to make visible a projected optical real image to the eyes of an observer, and means adapted to prevent ambient light from being reflected into the eyes of said observer, said means comprising a surface facing the observer and which is composed entirely of contiguous recesses, each recess being in the form of a triple pyramid having 90° dihedral angles between each of its three faces.

3. In an optical projection system for viewing projected images under conditions of disturbing ambient light, a translucent rear projection screen having a surface adapted to make visible to the eyes of an observer the projected optical real image, and means for reducing the effects of ambient stray-light on said screen, said means being positioned in proximity to said screen and comprising a specularly retroflective transparent surface facing the observer and which is composed entirely of contiguous triple pyramid-shaped recesses each of which has 90° dihedral angles between each of its adjacent faces.

(References on following page)

References Cited in the file of this patent
UNITED STATES PATENTS

| | | |
|---|---|---|
| 1,591,572 | Stimson | July 6, 1926 |
| 1,610,423 | Cawley | Dec. 14, 1926 |
| 1,666,808 | Buchner | Apr. 17, 1928 |
| 1,950,560 | Martinek et al. | Mar. 13, 1934 |
| 1,970,358 | Bull et al. | Aug. 14, 1934 |
| 2,161,842 | Allison | June 13, 1939 |
| 2,380,447 | Jungersen | July 31, 1945 |
| 2,538,638 | Wilson | Jan. 16, 1951 |
| 2,588,373 | Erban | Mar. 11, 1952 |
| 2,622,220 | Geer | Dec. 16, 1952 |